(12) United States Patent
Andreani et al.

(10) Patent No.: US 12,286,228 B2
(45) Date of Patent: Apr. 29, 2025

(54) ACTUATOR ARRANGEMENT FOR A WING ASSEMBLY OF AN AIRCRAFT

(71) Applicant: Airbus Operations GmbH, Hamburg (DE)

(72) Inventors: Luc Andreani, Hamburg (DE); Florian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 55 days.

(21) Appl. No.: 18/325,944

(22) Filed: May 30, 2023

(65) Prior Publication Data
US 2023/0382516 A1 Nov. 30, 2023

(30) Foreign Application Priority Data
May 31, 2022 (EP) ..................................... 22176554

(51) Int. Cl.
*B64C 9/02* (2006.01)
*B64C 9/16* (2006.01)

(52) U.S. Cl.
CPC .................... *B64C 9/02* (2013.01); *B64C 9/16* (2013.01)

(58) Field of Classification Search
CPC ................ B64C 9/02; B64C 9/16; B64C 9/18
See application file for complete search history.

(56) References Cited

U.S. PATENT DOCUMENTS

| 4,544,118 A * | 10/1985 | Robinson | B64C 9/06 244/225 |
| 8,276,842 B2 * | 10/2012 | Kracke | B64C 13/28 244/99.2 |
| 2005/0011994 A1 * | 1/2005 | Sakurai | B64C 9/16 244/212 |
| 2021/0061437 A1 * | 3/2021 | Daandels | B64C 3/50 |

FOREIGN PATENT DOCUMENTS

| CN | 110562437 A | 12/2019 |
| EP | 0239138 A2 | 9/1987 |
| EP | 10303458 A2 | 2/1989 |
| EP | 3539864 A1 | 9/2019 |
| EP | 3584154 A1 | 12/2019 |

OTHER PUBLICATIONS

Extended Search Report cited in EP22176554.8, dated Nov. 9, 2022, 7 pages.

* cited by examiner

*Primary Examiner* — Brady W Frazier
*Assistant Examiner* — Shanna Danielle Glover
(74) *Attorney, Agent, or Firm* — Nixon & Vanderhye P.C.

(57) ABSTRACT

A actuator arrangement is disclosed in which the high-lift device support that supports and guides movement of a high-lift device, such as a flap, is in axial alignment with a control actuator assembly that controls one or more control surfaces. This allows a single support fairing to be sufficient for covering both the track member and the control actuator assembly and allowing for reduced drag and weight.

19 Claims, 4 Drawing Sheets

ACTUATOR ARRANGEMENT FOR A WING ASSEMBLY OF AN AIRCRAFT

CROSS REFERENCE TO RELATED APPLICATION

This application claims priority European Application Number EP22176554.8, filed May 31, 2022, the entire contents of which is hereby incorporated by reference.

BACKGROUND

The presented disclosure relates to an actuator arrangement for a wing assembly of an aircraft. Furthermore, the invention relates to a wing assembly and an aircraft equipped with said actuator arrangement.

Aircraft may have multifunctional control devices on flaps sometimes known as flaperons. These multifunctional control devices can be used as roll control surfaces, variable camber and differential flap setting surfaces, flatter control surfaces, lateral trim surfaces, etc. There is challenge in integrating the multifunctional control actuators into the flap structure due to the limited space or constraints, for example. Other topics include load carrying capability and structure flap stiffness. Furthermore, the system installation and the flight-test installation integration have proven to cause high effort. Today a lot of additional blister fairings and additional reinforcements of the flap structure are used for the integration of the actuators. This is associated with additional drag and weight.

SUMMARY

The present invention contemplated improving aerodynamic properties of aircraft, and reducing drag and weight.

The disclosure provides an actuator arrangement for a wing assembly of an aircraft, the arrangement comprising:
- a high-lift device support that movably supports a high-lift device such that the high-lift device is movable between a fully retracted position and fully extended position;
- at least one control surface that is movably supported by the high-lift device; and
- at least one control actuator assembly that is operatively coupled the control surface for controlling the deflection of the control surface,
- wherein the control actuator assembly, in an installed position, is arranged relative to the high-lift device support such that the control actuator assembly and the high-lift device are in axial alignment along a longitudinal axis of the high-lift device support.

In a front view, the control actuator assembly may be arranged relative to the high-lift device support such that due to the axial alignment the control actuator assembly and the high-lift device support at least partially overlap when viewed along the longitudinal axis.

The control actuator assembly, in an installed position, may be arranged relative to the high-lift device support such that in a top-down view, or in a top-down view and a lateral view, the control actuator assembly and the high-lift device are in axial alignment along a longitudinal axis of the high-lift device support.

The high-lift device may be configured as a flap or a slat. Preferably, the control surface is configured as an aileron, an elevator, or a spoiler.

The control actuator assembly may be arranged on the same side of the high-lift device as the high-lift device support in the installed position.

The control actuator assembly may be arranged below high-lift device and the control surface in an installed position.

The control actuator assembly may be arranged aft of the high-lift device support in the installed position.

The control actuator assembly may be mounted to the high-lift device so as to be movable together with the high-lift device.

The control actuator assembly may be mechanically coupled to the control surface via a transmission member.

The control actuator assembly may include a rotatory actuator that has a rotatable lever member that is operatively coupled, preferably via the transmission member, to the control surface.

The lever member may be directly mechanically coupled to the transmission member. Preferably, the transmission member is directly mechanically coupled to a lever portion of the control surface.

The transmission member may be mechanically coupled to the control actuator assembly and/or the control surface and/or the rotatable lever via trunnion.

The high-lift device support may comprise a support fairing that extends along the longitudinal direction of the high-lift device support, wherein the support fairing covers the control actuator assembly such that at least in the fully retracted position, the control actuator is at least partially, preferably mostly, preferably fully covered by the support fairing.

The control actuator assembly may comprise a first control actuator and a second control actuator that are operatively coupled to a first control surface and to a different second control surface via a first transmission member and second transmission member, respectively, for individually controlling the deflection of the first and second control surfaces.

The first control actuator or the second control actuator may include an offset member that is configured such that the first and second transmission members do not mechanically block each other.

Preferably, the high-lift device support comprises a track member that is configured to support and guide the high-lift device along a movement path between the fully retracted position and the fully extended position.

The high-lift device may comprise a bracket member that engages the high-lift support device, preferably the track member.

The actuator arrangement may further comprise a deployment actuator that is configured to drive the high-lift device from the fully retracted position to the fully extended position and vice versa.

The track member may include a track cam, and the bracket member is operatively coupled to the high-lift device so as to tilt the high-lift device in accordance with a bracket member location in the track cam.

The disclosure provides a wing assembly for an aircraft comprising a wing box and an installed previously described actuator arrangement.

The high-lift device support may be arranged on a bottom side of the wing assembly.

The disclosure provides an aircraft comprising a preferred actuator arrangement and/or a preferred wing assembly.

One idea is to locate the multicontrol surface actuators behind the flap tracks or flap supports. Such an actuator position generally does not increase the fairing size due to the fairing tail cone currently not being used for structural or system components.

In some embodiments this will also work with actuated movable fairings with kinematic linkages. In this case the actuators may still be attached to the high-lift device and drive the multicontrol surfaces on each side of the fairing.

In some embodiments the movable fairing may be directly attached to the flap. In some embodiments a movable fairing cover may be attached to the flap. In some embodiments the multicontrol surfaces actuator is integrated into the fairing. In some embodiments two electro servo actuators may be present for each control surface, preferably on the inboard and/or the outboard side of the actuators.

In some embodiments a rotatory actuator drives a multifunctional control surface. In some embodiments the connection between the rotatory actuator and the control surface is done with a tension/compression strut. It is also possible to use linear actuators instead of rotatory actuators. The actuators can be powered by electric, hydraulic, mechanical or any other suitable energy source that is present on an aircraft.

In some embodiments the actuator is attached with a cantilever beam or other means of structure to the flap. In some embodiments the attachment of the tension/compression strut to the control surface is done with a trunnion concept to transfer the rotation to the control surface. In some embodiments the trunnion is crossing the fairing shape with a simple hole, which may simplify the sealing principle.

The arrangement may be realized with one, two or a higher number of actuators, which can be connected to the multifunctional control surfaces outside of the fairing.

In some embodiments a solution is realized with one or two actuators behind the tracks/supports connected to one control surface.

In some embodiments the actuator arrangement can be used with a high-lift system with flap track fairings, which are equipped with multifunctional control devices, such as flaperons, mini trailing edge devices (miniTEDs) or any other multifunctional trailing edge device.

The ideas disclosed herein allow better integration of the actuator into the wing, thereby improving the overall drag, weight, and performance of the aircraft. The integration allows to avoid or at least reduce blister fairings underneath the multifunctional control devices. Furthermore, structural reinforcements in the multifunctional control devices may be reduced or avoided. In some embodiments it is possible to avoid an increase in the width of the flap track fairings (FTFs) or flap support fairings (FSFs). In some embodiments the presented arrangement in general can avoid an increase in the depth of the fairings. A side-by-side arrangement of the multifunctional control actuators and the flap tracks can be avoided, thereby avoiding a significant impact on fairing width.

It should be noted that not all advantages must be achieved at the same time or with the same intensity.

BRIEF DESCRIPTION OF THE DRAWINGS

For an understanding of embodiments of the disclosure, reference is now made to the following description taken in conjunction with the accompanying drawings, in which.

In the Figures, similar or identical elements and features are designated by the same reference numbers. The features, functions and advantages discussed herein and shown in the embodiments can be achieved independently and combined in other embodiments.

DETAILED DESCRIPTION OF SOME EMBODIMENTS

Some embodiments will now be described with reference to the Figures.

Figure 1:
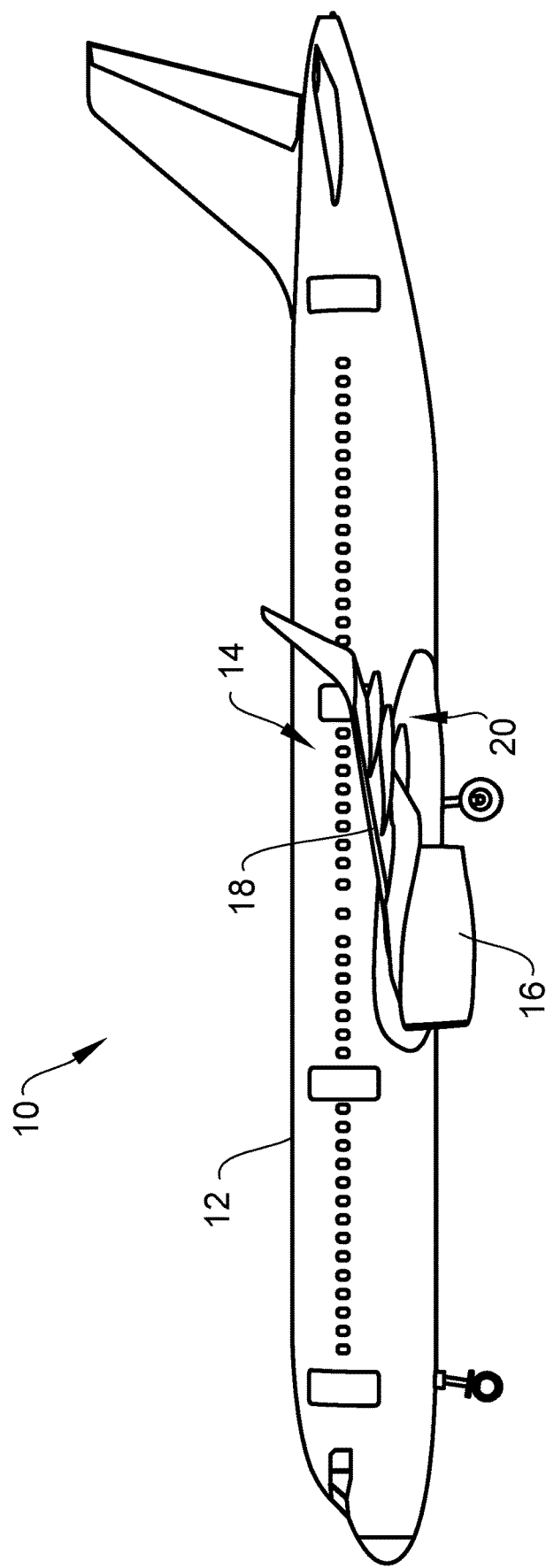
FIG. 1 is a side view of an embodiment of an aircraft.

Referring to FIG. 1 an aircraft 10 is depicted. The aircraft 10 comprises a fuselage 12 to which a pair of wings 14 is attached. An engine 16 is suspended from each wing 14.

In a manner known per se, the wing 14 is configured in the form of a wing assembly 18 that typically includes a wing box to which a number of attachment parts are mounted. Here, the wing assembly 18 comprises an actuator arrangement 20.

Figure 2:
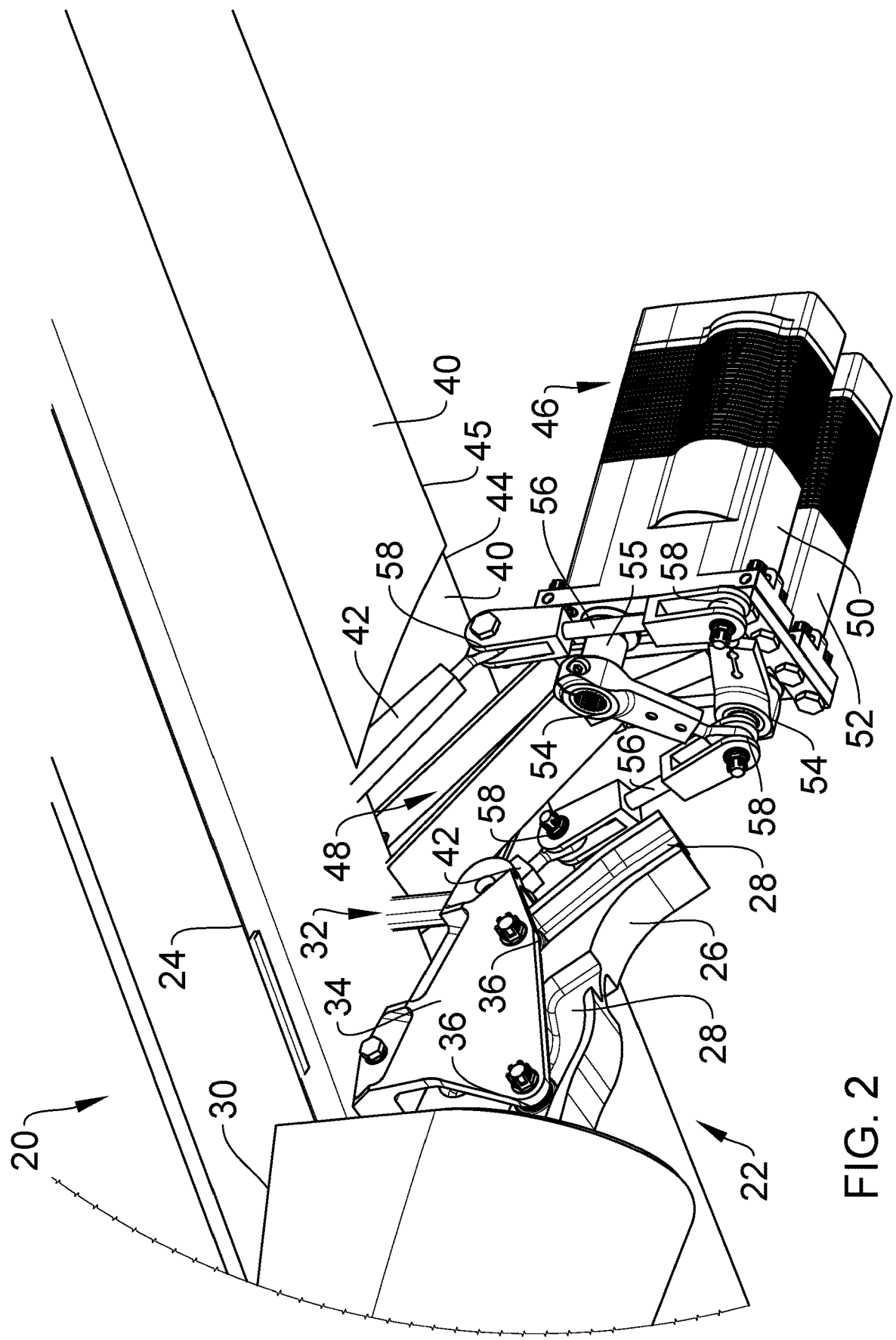
FIG. 2 is a partial perspective view of an embodiment of a wing assembly.

Referring to FIG. 2, the actuator arrangement 20 includes a high-lift device support 22. The high-lift device support 22 supports a high-lift device 24, such as a flap. The high-lift device 24 can be moved between a fully retracted position and a fully extended position by a deployment actuator (not shown).

The high-lift device support 22 extends in a longitudinal direction L that is substantially parallel to the forward-aft direction of the aircraft 10.

The high-lift device support 22 includes a track member 26. The track member 26 is arranged substantially parallel to the longitudinal direction.

The track member 26 may include a plurality of track cams 28. The track cam 28 is arranged on a lateral side of the track member 26. The track cam 28 may be formed as a U-shaped groove, wherein the groove bottom is oriented in a vertical direction.

The high-lift device support 22 comprises a support fairing 30. The support fairing 30 is aerodynamically shaped and covers the track member 26 typically from three sides (lateral inboard/outboard and bottom). The support fairing 30 substantially extends parallel to the longitudinal direction. Part of the support fairing 30 is omitted in FIG. 2 for visibility reasons.

The high-lift device 24 includes a support strut portion 32. The support strut portion 32 is arranged on the bottom side of the high-lift device 24 and protrudes towards the high-lift device support 22, preferably towards the track member 26.

The high-lift device 24 includes a bracket member 34. The bracket member 34 is configured to engage the high-lift device support 22. Preferably, the bracket member 34 engages the track member 26. The bracket member 34 may comprise a plurality of rollers 36 that run on the track member 26, preferably inside the track cams 28.

The track member 26 in cooperation with the bracket member 34 may determine the tilt of the high-lift device 24, preferably based on the track cam 28.

The actuator arrangement 20 includes a plurality of control surfaces 40.

The control surface 40 is supported by the high-lift device 24. The control surface 40 may be configured as an elevator, as an aileron, or as a spoiler. The control surface 40 includes a control lever portion 42. The control lever portion 42 protrudes downward from the bottom side of the control surface 40 and towards aft.

As an example, the actuator arrangement 20 may include a first and second control surface 44, 45. The first and second control surfaces 44, 45 are individually supported by the high-lift device 24. The first and second control surfaces 44, 45 are preferably aligned along a spanwise direction.

The actuator arrangement 20 includes a control actuator assembly 46. The control actuator assembly 46 is arranged in axial alignment with the high-lift device support 22, preferably with the track member 26, along the longitudinal direction.

In other words, the control actuator assembly 46 is preferably partially covered from view by the high-lift device support 22, when viewed from the front along the longitudinal direction.

The control actuator assembly 46 is mounted to the high-lift device 24 by a cantilever member 48. The cantilever member 48 is arranged to be in alignment with the track member 26 and preferably extends such that the control actuator assembly 46 is in axial alignment with the track member 26. The control actuator assembly 46 is preferably arranged within the support fairing 30 and preferably aftward of the track member 26.

As an example, the control actuator assembly 46 includes a first and second actuator 50, 52. For sake of brevity only the first actuator 50 is described in more detail. The second actuator 52 is configured identically.

The first actuator 50 is configured as a rotatory actuator. The first actuator 50 includes a lever member 54. The lever member 54 is mechanically coupled to a transmission member 56 via a trunnion 58. The transmission member 56 is preferably configured as a strut member.

The transmission member 56 is mechanically coupled to the first control surface 42, preferably via the control lever portion 42. The transmission member 56 is coupled to the first control surface 42 via another trunnion 58.

The transmission member 56 is mechanically coupled in such a manner that different rotations may be compensated and drive force can be transmitted from the first actuator 50 to the first control surface 42, so as to control the deflection of the first control surface 42.

The first actuator 50 may include an offset member 55. The offset member 55 arranges the lever member 54 such that during their respective movement/rotation, the first and second actuators 50, 52 do not block each other.

The control actuator assembly 46 may include a mounting member 54. The mounting member 54 mounts the first and second actuators 50, 52 together as a single unit.

Figure 3:
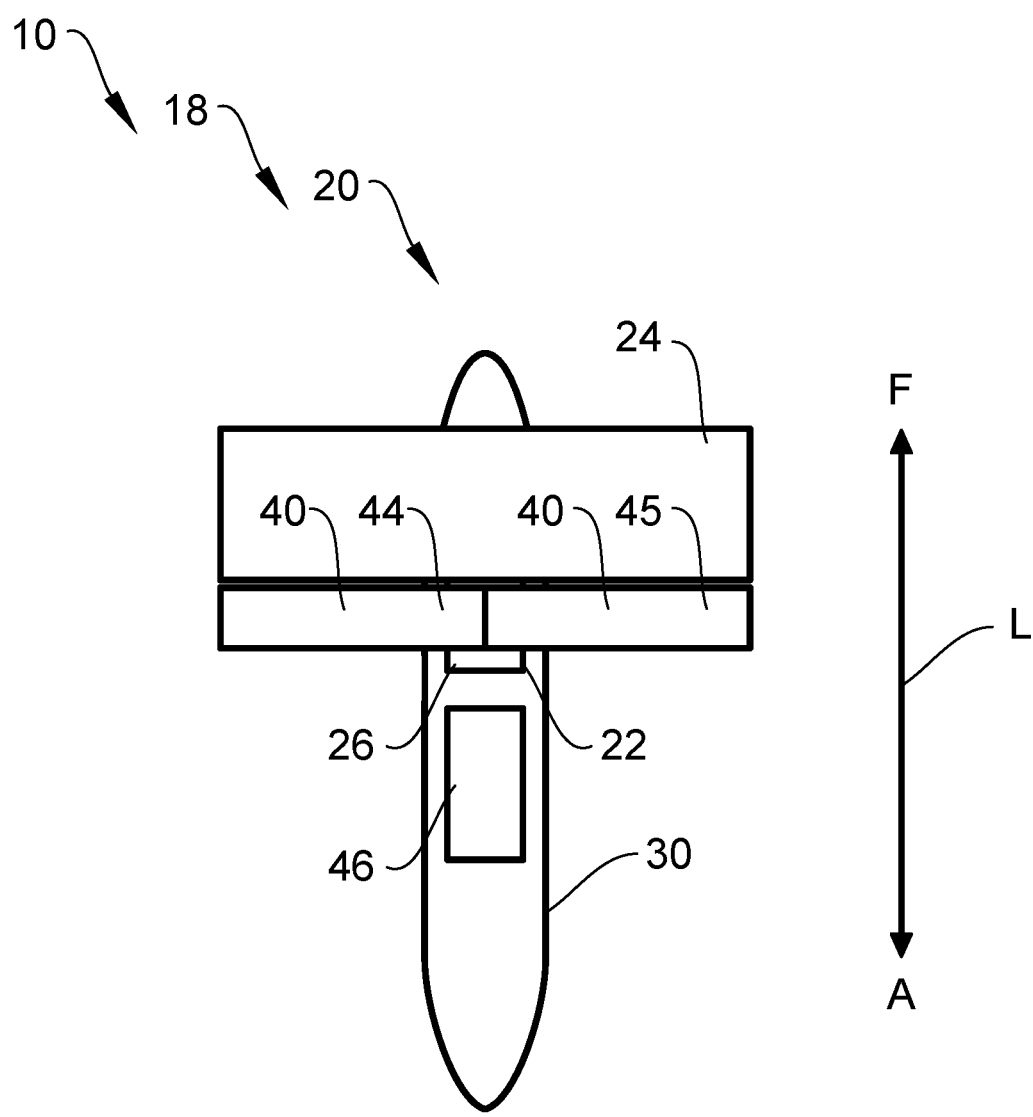
FIG. 3 is a top view in a fully retracted position; and,
FIG. 4 is a top view in a fully extended position.
Figure 4:
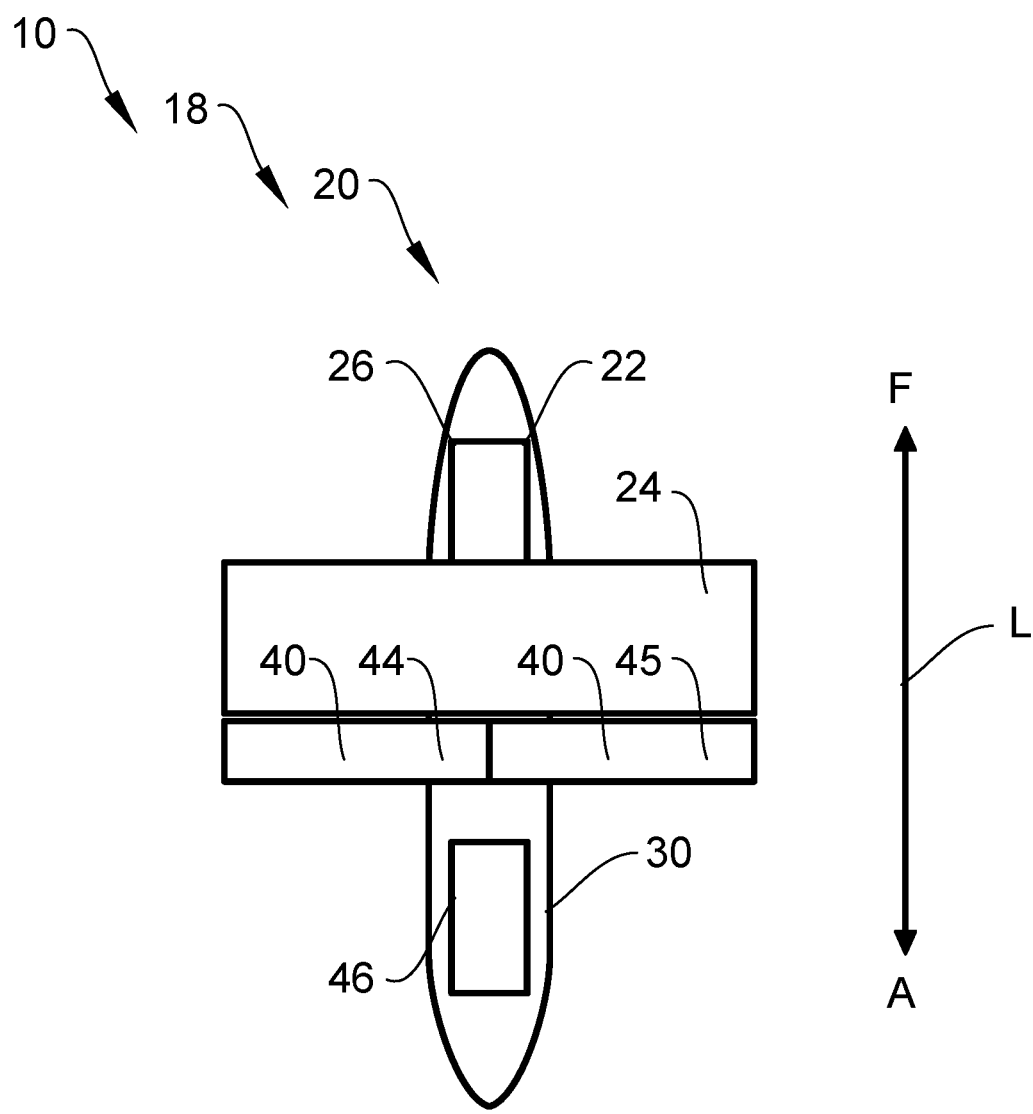

Referring to FIGS. 3 and 4, the operation of the control actuator assembly 46 is described in more detail. In FIG. 3 and FIG. 4 the drawing is oriented such that the forward direction F of the aircraft 10 is towards the top of the page and the aft direction A of the aircraft 10 is towards the bottom of the page.

Starting with FIG. 3, the high-lift device 24 is in the fully retracted position. The control actuator assembly 46 is positioned in axial alignment with the track member 26 and adjacent thereto with a minimal distance. The control actuator assembly 46 preferably fully accommodated within the support fairing 30. The control actuator assembly 46 is able to control the deflection of the control surfaces 40.

When the high-lift device 24 gets extended by the deployment actuator, say to an intermediate position, the control actuator assembly 46 moves substantially along the longitudinal direction and the distance between the track member 26 increases.

During the extending the high-lift device 24, the high-lift device 24 gets tilted in accordance with the position of the bracket member 34 on the track member 26. The control actuator assembly 46 may also follow the movement, preferably tilt, of the high-lift device 24.

The position of the control actuator assembly 46 relative to the control surfaces 40 does not change during this movement so that the control surfaces 40 are not deflected due to extending and retracting the high-lift device 24. At each intermediate position of the high-lift device 24 between the fully retracted and extended positions, the control actuator assembly 46 is configured to control the deflection of the control surfaces 40.

Referring to FIG. 4, the high-lift device 24 is fully extended. The control actuator assembly 46 was moved within the support 30 and preferably stayed in the support fairing 30.

In some embodiments, the high-lift device support 22 may also tilt during the extension of the high-lift device 24. In this case, the control actuator assembly 46 also follows this movement. With the measures described herein drag and weight of an aircraft 10 may be reduced by a specific actuator arrangement 20. In this arrangement, the high-lift device support 22 that supports and guides movement of a high-lift device 24, such as a flap, is in axial alignment with a control actuator assembly 46 that controls one or more control surfaces 40. With this a single support fairing 30 is sufficient for covering both the track member 26 and the control actuator assembly 46, thereby allowing for reduced drag and weight.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An actuator arrangement for a wing assembly of an aircraft, comprising:
   a high-lift device support that movably supports a high-lift device such that the high-lift device is movable between a fully retracted position and a fully extended position;
   at least one control surface movably supported at a trailing edge of the high-lift device; and,
   at least one control actuator assembly operatively coupled to the control surface for controlling the deflection of the control surface,
   wherein the control actuator assembly is mounted to the high-lift device support such that the control actuator assembly and the high-lift device support are aligned along a longitudinal direction.

2. The actuator arrangement according to claim 1, wherein the control actuator assembly is arranged on the same side of the high-lift device as the high-lift device support in the installed position.

3. The actuator arrangement according to claim 1, wherein the control actuator assembly is arranged aft of the high-lift device support in the installed position.

4. The actuator arrangement according to claim 1, wherein the control actuator assembly is mounted to the high-lift device so as to be movable together with the high-lift device.

5. The actuator arrangement according to claim 1, wherein the control actuator assembly is mechanically coupled to the control surface via a transmission member.

6. The actuator arrangement according to claim 1, wherein the control actuator assembly includes a rotatory actuator that has a rotatable lever member that is operatively coupled via a transmission member, to the control surface.

7. The actuator arrangement according to claim 6, wherein the transmission member is mechanically coupled to the control actuator assembly and/or the control surface and/or the rotatable lever member via a trunnion.

8. The actuator arrangement according to claim 1, wherein the high-lift device support comprises a support fairing that extends along the longitudinal direction of the high-lift device support, wherein the support fairing covers the control actuator assembly such that at least in the fully retracted position, the control actuator assembly is at least partially, covered by the support fairing.

9. The actuator arrangement according to claim 1, wherein the at least one control surface comprises a first control surface and a second control surface, wherein the control actuator assembly comprises a first control actuator and a second control actuator that are operatively coupled to the first control surface and to the second control surface via a first transmission member and second transmission member, respectively, for individually controlling the deflection of the first and second control surfaces.

10. The actuator arrangement according to claim 9, wherein the first control actuator or the second control actuator includes an offset member that is configured such that the first and second transmission members do not mechanically block each other.

11. The actuator arrangement according to claim 1, wherein the high-lift device support comprises a track member that is configured to support and guide the high-lift device along a movement path between the fully retracted position and the fully extended position.

12. The actuator arrangement according to claim 1, wherein the high-lift device comprises a bracket member that engages the high-lift device support.

13. The actuator arrangement according to claim 1, further comprising a deployment actuator that is configured to drive the high-lift device from the fully retracted position to the fully extended position and vice versa.

14. A wing assembly for an aircraft comprising a wing box and the installed actuator arrangement according to claim 1.

15. An aircraft comprising the actuator arrangement according to claim 1.

16. An aircraft comprising the wing assembly according to claim 14.

17. The actuator arrangement according to claim 1, wherein the control actuator assembly is fully covered by a support fairing.

18. The actuator arrangement according to claim 1, wherein the high-lift device comprises a bracket member that engages a track member.

19. An actuator arrangement for a wing assembly of an aircraft, comprising:
a high-lift device support that movably supports a high-lift device such that the high-lift device is movable between a fully retracted position and a fully extended position;
at least one control surface that is movably supported by the high-lift device; and,
at least one control actuator assembly operatively coupled to the control surface for controlling the deflection of the control surface,
wherein the control actuator assembly is mounted to the high-lift device by a cantilever member such that the control actuator assembly and the high-lift device support are aligned along a longitudinal direction, and
wherein the high-lift device support comprises a track member.

* * * * *